US005455076A

United States Patent [19]
Lee et al.

[11] Patent Number: 5,455,076
[45] Date of Patent: Oct. 3, 1995

[54] METHOD AND APPARATUS FOR PROPORTIONING AND MIXING NON-COMPRESSIBLE AND COMPRESSIBLE FLUIDS

[75] Inventors: Chinsoo S. Lee; Richard A. Engelman, both of Charleston; James A. Condron, Hurricane, all of W. Va.

[73] Assignee: Union Carbide Chemicals & Plastics Technology Corporation, Danbury, Conn.

[21] Appl. No.: 132,131

[22] Filed: Oct. 5, 1993

[51] Int. Cl.⁶ ............................................. B05D 1/02
[52] U.S. Cl. ........................ 427/421; 427/8; 137/2; 137/3; 137/4; 137/10; 137/88; 137/98
[58] Field of Search ............. 427/8, 421; 137/2, 137/3, 4, 10, 88, 98

[56] References Cited

U.S. PATENT DOCUMENTS

| | | | |
|---|---|---|---|
| 4,324,294 | 4/1982 | McLoughlin et al. | 137/88 |
| 4,582,731 | 4/1986 | Smith | 427/421 |
| 4,734,227 | 3/1988 | Smith | 264/13 |
| 4,734,451 | 3/1988 | Smith | 524/493 |
| 4,923,720 | 5/1990 | Lee et al. | 427/422 |
| 5,009,367 | 4/1991 | Nielsen | 239/3 |
| 5,027,742 | 7/1991 | Lee et al. | 118/300 |
| 5,057,342 | 10/1991 | Hoy et al. | 427/422 |
| 5,098,194 | 3/1992 | Kuo et al. | 366/144 |
| 5,106,650 | 4/1992 | Hoy et al. | 427/27 |
| 5,108,799 | 4/1992 | Hoy et al. | 427/422 |
| 5,141,156 | 8/1992 | Hoy et al. | 239/135 |
| 5,171,613 | 12/1992 | Bok et al. | 427/422 |
| 5,178,325 | 1/1993 | Nielsen | 239/1 |
| 5,211,342 | 5/1993 | Hoy et al. | 239/707 |
| 5,215,253 | 6/1993 | Saidman et al. | 239/8 |
| 5,246,026 | 9/1993 | Proudman | 137/3 |

*Primary Examiner*—Shrive Beck
*Assistant Examiner*—David M. Maiorana
*Attorney, Agent, or Firm*—M. N. Reinisch

[57] ABSTRACT

The present invention is directed to methods and apparatus for effectively proportioning a mixture of compressible and non-compressible fluids, wherein the resulting mixture has an almost constant density. The present invention is particularly useful for admixing supercritical fluids with polymeric coating compositions for various spray applications.

8 Claims, 15 Drawing Sheets

FIG. II

METHOD AND APPARATUS FOR PROPORTIONING AND MIXING NON-COMPRESSIBLE AND COMPRESSIBLE FLUIDS

FIELD OF THE INVENTION

This invention pertains to mixing and proportioning a compressible fluid and a non-compressible fluid. In a preferred embodiment of the invention the compressible fluid is a supercritical fluid, the non-compressible fluid is a coating composition, and the resultant mixture is applied to a substrate by spraying techniques.

BACKGROUND OF THE INVENTION

Coating compositions are complex mixtures which often include binders, pigments, surfactants, flow-control agents, and organic solvents. Organic solvents serve a variety of purposes related to viscosity reduction, film formation and adhesion. In spraying paints and coatings, organic solvents reduce their viscosity. This viscosity reduction is needed to enable atomization when the material is sprayed and also to facilitate droplet coalescence on the surface, thus giving a coherent, uniform film. Spray atomization requires a very low viscosity to produce the fine droplets needed for high-quality coatings.

Despite the important role of volatile organic compounds ("VOC") play in the coating's formulation, there has been a considerable effort by the coating formulators and applicators to reduce VOC emissions for both economical and environmental reasons.

A great deal of emphasis has been placed on the development of new coating technologies which will reduce the emission of organic solvent vapors. A number of technologies have emerged as having met most but not all, of the performance and application requirements, and at the same time having met the emission requirements and regulations. They are (a) powder, (b) waterborne, dispersion, (c) waterborne, solution, (d) non-aqueous dispersion, and (e) high solids coatings. Each of these technologies has been employed in certain applications, and each has found a niche in a particular industry. In a majority of cases, the coatings from these new technologies are inferior to the old in one or more important application or performance features.

U.S. Pat. No. 4,923,720 discloses methods and apparatus for the production of the high solid coating formulation in which substantial amounts of the liquid solvent component have been removed and replaced with a non-toxic and environmentally compatible supercritical fluid, such as supercritical carbon dioxide. This coating composition is then sprayed onto a substrate at which time the supercritical carbon dioxide vaporizes to assist spray atomization. In order to produce a coating material solution or formulation with the desired application characteristics, the relative proportion of the liquid composition and supercritical carbon dioxide should be maintained at a predetermined ratio or within a predetermined range. However, one requirement of U.S. Pat. No. 4,923,720 is to control the relative proportion of liquid coating composition and supercritical fluid. The liquid coating composition and supercritical fluid are each introduced into the system by a separate pump. However, the volume of the supercritical carbon dioxide is varied depending upon the system pressure and temperature. This can result in deviation of the supercritical carbon dioxide concentration in the coating formulation, resulting in inconsistent spray characteristics.

U.S. Pat. No. 5,215,253 discloses an improved method and apparatus for forming and dispensing a coating material formulation or solution containing a fluid coating composition and a fluid diluent, such as a supercritical carbon dioxide. The control system opens and closes the supply of supercritical carbon dioxide and/or liquid coating composition in accordance with variation of capacitance in the formulation. The devices requires predetermined set point values to control supercritical carbon dioxide concentration in the coating formulation. However, the correlation between the carbon dioxide concentration in the coating formulation and the values obtained by capacitance sensor can vary significantly depending upon system pressure, temperature and coating formulation. Furthermore, with respect to compositions having both liquid and gas components in a multiple phase solution, it has been found that controlling carbon dioxide concentration is difficult. The signal from the capacitance sensing circuit produces a relatively widely fluctuating signal due to the formation of bubbles. Another deficiency of the apparatus is that the device requires the feed coating capacitance information of formulation before carbon dioxide addition to calculate control set point values with respect to carbon dioxide concentration.

Aforementioned U.S. Pat. No. 4,923,720 discloses an apparatus capable of pumping and proportioning a coating formulation and liquid carbon dioxide. In one embodiment, volumetric proportioning of the coating formulation stream and the supercritical carbon dioxide stream is carried out by means of reciprocating pumps which displace a volume of fluid from the pump during each one of its pumping cycles. One reciprocating pump is used to pump the coating formulation which is slaved to another reciprocating pump which is used to pump the liquid carbon dioxide. The piston rods for each pump are attached to opposite ends of a shaft that pivots up and down on a center fulcrum. The volume ratio is varied by sliding one pump along the shaft, which changes the stroke length.

However, liquid carbon dioxide is relatively compressible at ambient temperature, the temperature at which it is typically stored in a pressurized container. Such compressibility may undesirably cause fluctuations and oscillations of the amount of carbon dioxide that is present in the admixed coating formulation that is to be sprayed. This occurs due to the incompatible pumping characteristics of the relatively non-compressible coating formulation and the relatively compressible liquid carbon dioxide. With the coating formulation, pressure is immediately generated in the reciprocating pump as soon as its volume is displaced. Inasmuch as the liquid carbon dioxide is substantially compressible, a larger volume is needed to be displaced in order to generate the same pressure. Because mixing occurs when the flow of the coating formulation and of the liquid carbon dioxide are at the same pressure, the flow rate of carbon dioxide lags behind the flow rate of the coating formulation.

This oscillation is further accentuated if the driving force operating the pump varies during the operating cycle, such as an air motor changing direction during its cycle. Thus, if the driving force declines, the pressure in the coating formulation flow declines even more rapidly, due to its non-compressibility, than the pressure in the liquid carbon dioxide flow.

Accordingly, the pressures generated in both flows may be out of phase during the pumping. U.S. Pat. No. 4,621,927 discloses a mixture control apparatus controlling a flow rate of a second fluid to be mixed with a first fluid so as to prepare a third fluid having a predetermined concentration. A set point variable of the flow rate of the second fluid is calculated in accordance with the flow rate of the third fluid so as to improve controllability of the apparatus. However, the invention in U.S. Pat. No. 4,621,927 cannot control the mixture of compressible fluid(s) and non-compressible fluid(s) because the thermodynamic properties of the fluids are influenced by variables such as pressure, temperature, and concentration.

SUMMARY OF THE INVENTION

By virtue of the present invention, the above deficiencies have now been overcome. Methods and apparatus have been discovered which are capable of accurately and continuously providing a proportioned mixture comprised of a non-compressible fluid and a compressible fluid.

In particular, the present invention measures the volumetric flow of the non-compressible fluid stream before and after the addition of compressible fluid to determine and to control the amounts of compressible fluid. This invention simply and accurately proportions the fluids because it has been surprisingly discovered that the density of the non-compressible fluid and compressible fluid mixture does not vary significantly in many systems as long as the solubility limit of the compressible fluid in the non-compressible fluid mixture is not exceeded.

As used herein, the phrase "compressible fluid" is meant to include a material whose density is affected by a change in pressure to an extent of at least about 5%. As used herein, all fluids are understood to be at one atmosphere pressure and 0° C. unless otherwise noted.

More specifically, the present invention in its broader embodiment comprises an apparatus for continuously mixing a substantially compressible fluid and a substantially non-compressible fluid in a predetermined proportion which includes:

a) means for supplying substantially compressible fluid;

b) means for supplying substantially non-compressible fluid;

c) means for measuring the volumetric flow rate of the substantially non-compressible fluid;

d) means for generating a signal based upon the volumetric flow rate of the substantially non-compressible fluid;

e) means for forming a mixture of the measured substantially non-compressible fluid and substantially compressible fluid, such that the density of the resulting mixture behaves substantially like a non-compressible fluid;

f) means for measuring the volumetric flow rate of said mixture;

g) means for generating a signal based upon the flow rate of the substantially compressible fluid and substantially non-compressible fluid mixture; and h) means for controlling the flow rate of the substantially compressible fluid in response to the signals generated in (d) and (g).

As used herein, the phrases "coating formulation" or "coating composition" are understood to mean a typical, conventional coating composition which does not have any supercritical fluid admixed therewith. Also as used herein, the phrases "admixed liquid mixture" or "admixed coating formulation" are meant to include an admixture of a coating formulation with at least one supercritical fluid.

The present invention also comprises a method for forming a mixture of a substantially compressible fluid and a substantially non-compressible fluid in a predetermined proportion which comprises:

a) providing a non-compressible fluid;

b) measuring said non-compressible fluid's volumetric flow rate;

c) providing a compressible fluid;

d) mixing the compressible fluid with the non-compressible fluid such that the density of the resulting mixture behaves substantially as a non-compressible fluid;

e) measuring the volumetric flow rate of the mixture; and f) controlling the flow rate of the compressible fluid based upon the volumetric flow rate of said mixture.

As used herein "substantially as a non-compressible fluid" is understood to include a mixture whose density is unaffected by a change in concentration of the components in the mixture of less than about 10%, preferably of less than 5%, and most preferably of less than 2%.

By measuring the volumetric flow rate of the non-compressible fluid and compressible fluid/non-compressed fluid mixture and then controlling the flow rate of the compressible fluid pump, the difficulties associated with handling a compressible fluid are substantially eliminated. In a preferred embodiment of the invention the density of the resulting fluid mixture is also measured to ensure that the fluid mixture is behaving substantially as a non-compressible fluid.

DETAILED DESCRIPTION OF THE DRAWINGS

DETAILED DESCRIPTION OF THE INVENTION

Figure 1:
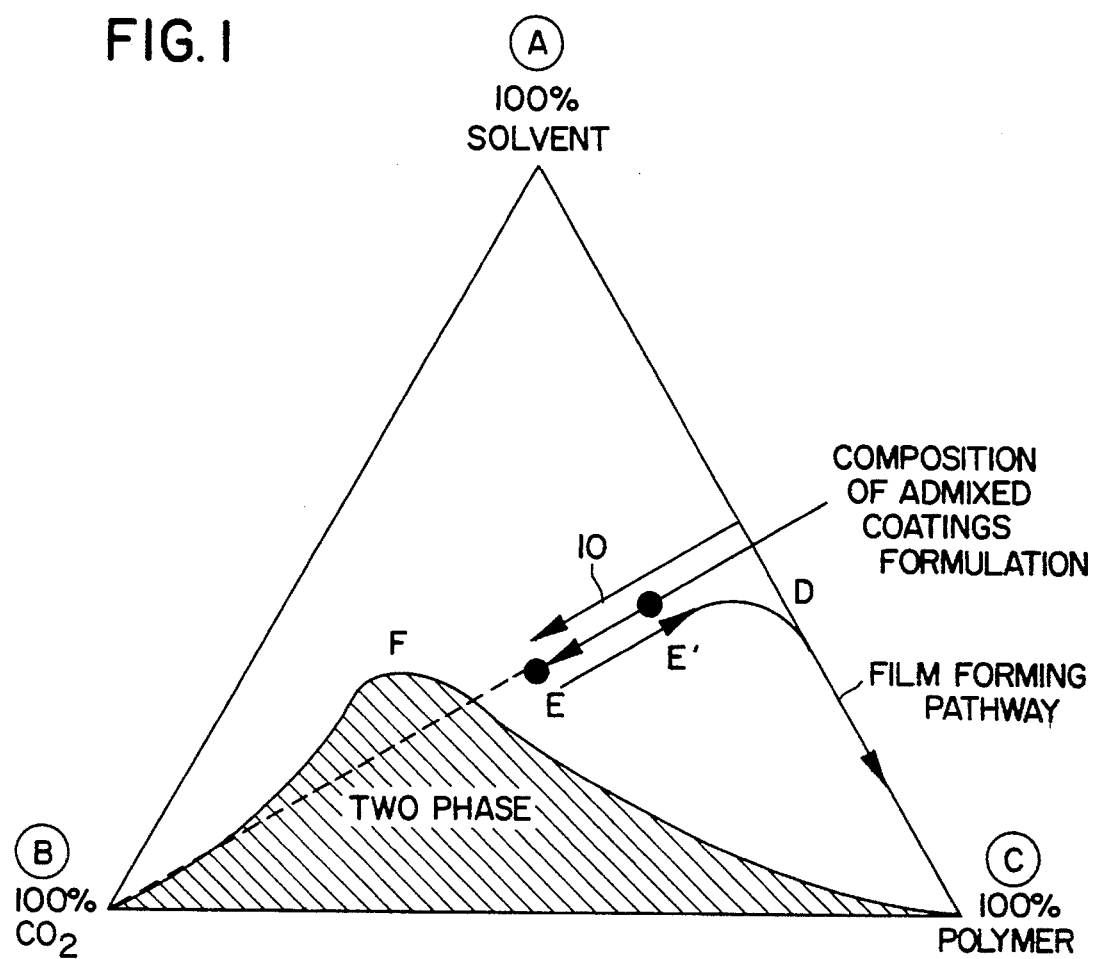
FIG. 1 is a phase diagram for a supercritical carbon dioxide, polymer and solvent system.

It is to be understood that while the following discussion will primarily focus upon providing a proportionated admixed liquid mixture of a coating formulation and supercritical fluid, such as carbon dioxide, which is suitable for being sprayed onto a substrate, the present invention is in no way limited to this embodiment. As is readily apparent from the foregoing discussion, the present invention encompasses the proportionation of any compressible and non-compressible fluid to form a desired mixture for any intended subsequent use.

The coating compositions employed in this invention are broadly defined to include paints, lacquers, adhesives and the like. Such coating materials may also include those that are typically utilized in the agricultural field such as, but not limited to, fertilizers, herbicides and insecticides.

The coating compositions employed in the present invention typically comprises a solids component containing at least one polymeric component, pigments, melting agents, cross-linking agents, ultraviolet light stabilizers. In addition to the solids component, a solvent fraction is also employed, including active solvents, coupling solvents and water. Other liquid components often found in coating compositions may also be used such as curing agents, plasticizers, surfactants and the like. The components of both the solvent fraction and the liquid fraction of coating compositions are well known to those with skill in the art. A more thorough discussion of the components found in coating compositions can be found in U.S. Pat. No. 5,171,613.

Supercritical fluid phenomenon is well documented, (see pages F-62-F-64 of the *CRC Handbook of Chemistry and Physics*, 67th Edition, 1986–1987, published by the CRC Press, Inc., Boca Raton, Fla.). At high pressures above the critical point, the resulting supercritical fluid, or "dense gas", will attain densities approaching those of a liquid and will assume some of the properties of a liquid. These properties are dependent upon the fluid composition, temperature, and pressure. As used herein, the "critical point" is the transition point at which the liquid and gaseous states of a substance merge into each other and represents the combination of the critical temperature and critical pressure for a given substance. The "critical temperature", as used herein, is defined as the temperature above which a gas cannot be liquefied by an increase in pressure. The "critical pressure", as used herein, is defined as that pressure which is just sufficient to cause the appearance of two phases at the "critical temperature".

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the present invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure (the critical point) of that compound.

Examples of compounds which are known to have utility as supercritical fluids are listed in aforementioned U.S. Pat. No. 4,723,920.

Due to the low cost, environmental acceptability, non-flammability and low critical temperature of carbon dioxide, supercritical carbon dioxide fluid is preferably used with the coating formulations. For many of the same reasons, nitrous oxide ($N_2O$) is a desirable supercritical fluid for admixture with the coating formulations. However, any of the supercritical fluids and the mixtures thereof are to be considered as being applicable for use with the coating formulations.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

Due to the solvency of the supercritical fluid with the coating formulations, a single phase liquid mixture is formed which is capable of being sprayed by airless spray techniques.

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray, airless spray, and air-assisted airless spray can also be used with the liquid coating formulation heated or with the air heated or with both heated. Heating reduces the viscosity of the liquid coating formulation and aids atomization. The present invention can also be applied by electrostatic applications as described in U.S. Pat. No. 5,106,650.

In essentially every process in which a mixture is prepared for a particular purpose, the constituents of that mixture usually need to be present in particular, accurately proportioned amounts in order for the mixture to be effective for its intended use. In the aforementioned related patent, the underlying objective is to reduce the amount of organic solvent present in a coating formulation by the use of supercritical fluid. Understandably, with this objective in mind, it is generally desirable to utilize as much supercritical fluid as possible while still retaining the ability to effectively spray the liquid mixture of coating formulations and supercritical fluid and also obtain a desirable coating on the substrate. Accordingly, here too, it is particularly preferred that there be prescribed, proportionated amounts of supercritical fluid and of coating formulation present in the liquid coating mixture to be sprayed.

Generally, the preferred upper limit of supercritical fluid addition is that which is capable of being miscible with the coating formulation. This practical upper limit is generally recognizable when the admixture containing coating formulation and supercritical fluid breaks down from one phase into two fluid phases.

To better understand this phenomenon, reference is made to the phase diagram in FIG. 1 wherein the supercritical fluid is supercritical carbon dioxide fluid. In FIG. 1, the vertices of the triangular diagram represent the pure components of an admixed coating formulation which for the purpose of this discussion contains no water. Vertex A is an organic solvent, vertex B is carbon dioxide, and vertex C represents a polymeric material. The curved line BFC represents the phase boundary between one phase and two phases. The point D represents a possible composition of a coating formulation in which supercritical carbon dioxide has not been added. The point E represents a possible composition of an admixed coating formulation, after admixture with supercritical carbon dioxide.

Thus, after atomization, a majority of the carbon dioxide vaporizes, leaving substantially the composition of the original coating formulation. Upon contacting the substrate, the remaining liquid mixture of the polymer and solvent(s) component(s) will flow, i.e., coalesce, to produce a uniform, smooth film on the substrate. The film forming pathway is illustrated in Figure I by the line segments EED (atomization and decompression) and DC (coalescence and film formation).

However, the amount of supercritical fluid, such as supercritical carbon dioxide, that can be mixed with a coating formulation is generally a function of the miscibility of the supercritical fluid with the coating formulation as can best be visualized by referring to FIG. 1.

As can be seen from the phase diagram, particularly as shown by arrow 10, as more and more supercritical carbon dioxide is added to the coating formulation, the composition of the admixed liquid coating mixture approaches the two-phase boundary represented by line BFC. If enough supercritical carbon dioxide is added, the two-phase region is reached and the composition correspondingly breaks down into two fluid phases. Sometimes, it may be desirable to admix an amount of supercritical fluid (in this case, supercritical carbon dioxide) which is even beyond the two phase boundary. Generally, however, it is not preferable to go much beyond this two phase boundary for optimum spraying performance and/or coating formation.

In addition to avoiding the two-phase state of the supercritical fluid and the coating formulation, proper proportionation is also desirable to provide optimum spraying conditions, such as, formation of desired admixed viscosity, formation of desired particle size, formation of desired sprayed fan shape, and the like.

Accordingly, in order to spray liquid coating formulations containing supercritical fluid as a diluent on a continuous, semicontinuous, and/or an intermittent or periodic on-demand basis, it is necessary to prepare such liquid coating formulations in response to such spraying by accurately mixing a proportioned amount of the coating formulation with the supercritical fluid. However, the compressibility of supercritical fluids is much greater than that of liquids. Consequently, a small change in pressure results in large changes in the density of the supercritical fluid.

The non-compressible fluid in the present invention is typically in the liquid state. The liquid state is characterized by the strong interaction of the molecules, which distinguishes liquids from gases, and the state of disorder of the molecular motion, which distinguishes liquids from solids. The behavior of liquids are generally well understood and their properties tend not to vary significantly over discrete ranges.

However, no known liquid solutions are exactly ideal. Solutions of highly similar components may only show slight deviations, whereas greater deviation are observed in almost all other solutions, where the components differ in size, mass and chemical nature. It has been observed that polymers do not easily blend to form true solutions. As a result, polymers separate into distinct phases when brought together if there are appreciable differences in the molecules. One of the easiest ways to characterize the differences in behavior of liquid mixture is to measure the density of the mixture.

FIG. 2 is a plot of liquid density versus composition of water and ethanol and water and iso-propyl alcohol at atmospheric pressure at 20° C. With the addition of ethanol or isopropyl alcohol to the mixture, the density of the mixture gradually decreases to the density of the undiluted alcohol. FIG. 3 demonstrates a similar result with a plot of the liquid density of dimethyl sulfoxide and acetone at atmospheric temperature and pressure.

Some polymers in liquid solvents also behave similarly. Referring to FIG. 4, an acrylic polymer (AT954, Rohm & Haas Co.) and n-methyl aryl ketone (MAK) were mixed at atmospheric pressure and 25° C. With increasing MAK levels, the density of the mixture decreased gradually to the density of pure MAK.

Surprisingly, it has been discovered that in contrast to the above mixtures wherein the density of the mixture compositions uniformly decreases, mixtures of polymeric compositions, solvents and compressible fluids undergo a period wherein the density is relatively constant. This relatively constant density mixture remains until a two phase mixture is created at which point the density of the mixture changes rapidly.

Referring to FIG. 5, a plot of mixture density of the components listed in Table 1 below, in carbon dioxide is presented.

TABLE 1

| COMPONENTS | WEIGHT PERCENT |
|---|---|
| Alkyd, Reichhold 6255-03 | 21.6% |
| Nitrocellulose, | 6.0% |
| Plasticizer | 2.4% |
| Urea, Bettle 80 resin | 10.0% |
| Solvents | 60.0% |
| (mixture of MAK, i-propyl alcohol, n-butanol, and ethylethoxy propionate (EEP)) | |

With the addition of carbon dioxide (up to 30 weight percent) to the composition in Table 1, the mixture density decreased less than 1.2 percent. With the addition of more than 40 percent carbon dioxide, mixture densities decreased significantly and two distinct phases were created, a carbon dioxide rich phase and a polymer rich phase.

Without wishing to be bound by any theory, we believe that the arrangement of the polymer and solvent molecules change with the continuing addition of carbon dioxide to a polymer-solvent mixture such that the coating formulation maintains a constant ratio between the total mass and the total volume (the density of the system). Such effect would be a result of an enhanced interaction between the solvent and the polymer due to the presence of carbon dioxide. The large free volume contributed to the system by the carbon dioxide would permit a better solvent and polymer interaction, resulting in a smaller density reduction than expected.

Referring now to FIG. 6, apparatus is depicted which by taking advantage of the relative constant density, is capable of pumping, pressurizing, proportioning, heating, and mixing a coating composition with carbon dioxide to form an admixed liquid mixture through only volumetric measurements. The coating composition and supercritical carbon dioxide is provided at the precisely desired proportions ready for being sprayed. The apparatus depicted herein is able to simply and elegantly proportion the liquid mixture by making use of the constant density phenomena described herein. As noted above, while this discussion is focused on carbon dioxide it is not limited to this material and the present invention may include any compressible fluid.

In particular, carbon dioxide is supplied as a liquid from any suitable source (9), such as a tank or cylinder. Preferably, the liquid carbon dioxide is supplied on a continuous basis. The carbon dioxide is then fed to carbon dioxide feed pump (7) through an optional 0–3000 psi pressure indicator (8). The carbon dioxide is sent to a control valve (10) then heated to about 30°–80° C. in the preheater (3) and then sent to mixer (5). Referring now to the coating composition, the coating is supplied by a pump (1) through an optional pressure gauge (2), through a flow meter (4) to the preheater (3). The coating composition is then sent to the mixing unit (5) to form the admixed liquid mixture.

The flow rate of the coating composition and carbon dioxide are then measured by the second flow meter (11). An optional thermocouple (6) is preferably provided. An optional density meter (17) is preferably provided to monitor the density of the admixed coating formulation. In a most preferred embodiment a density meter is employed to ensure that the flow rate of carbon dioxide does not become so large as to create a significant change in the density of the admixed coating formulation. A sight gauge (18) is preferably employed for phase analysis. The admixed coating formulation mixture can then be adjusted to desired final temperature by an optional heater (not shown) and provided through a conduit (13) to the spray gun (14). The mixture of coating and carbon dioxide also can be recirculated through the heater (12) and recirculation pump (16) to maintain constant spray temperature if desired. A multi-channel flow ratio computer (15) receives the signals of the flow rates from both the flow meters and is used to output signal to control the flow rate of the carbon dioxide via control valve (10).

The specific equipment items employed in FIG. 1 are listed in Table 2 below.

TABLE 2

| ITEM | DESCRIPTION |
|---|---|
| 1 | Coatings feed pump, Graco Model 205-530 |
| 2 | Pressure indicator, range from 0 to 3000 psi |
| 3 | Nordson H-400 series paint heater |
| 4 | Precision gear meter, ZHM-01, AW. Co. |
| 5 | Sparger and static Kenics ™ mixer |
| 6 | Thermocouple, k-type |
| 7 | Carbon dioxide feed pump, Haskel Model No. DSF-25 with 51050 Spool |
| 8 | Pressure indicator, range from 0 to 3000 psi |
| 9 | Carbon dioxide Cylinder |
| 10 | Jordan control valve, Model 708, 0.002 cv, linear trim |
| 11 | Precision gear meter, ZHM-01, AW. Co. |
| 12 | Nordson paint heater |
| 13 | High pressure spray hose |
| 14 | High pressure spray gun |
| 15 | Multi-channel flow ratio computer, EMO-1005 |
| 16 | Ross MF-24-11-10-AAAA Recirculation pump |
| 17 | Micromotion Model No. D40HSS Density meter |
| 18 | Jergenson ™ sight gauge |

The type of volumetric flow meter used in the present invention is not critical. Any suitable volumetric flow meter such as gear meters, turbines and rotameters and the like may be used of which gears meters are preferred.

Whereas, the exact scope of the present invention is set forth in the appended claims, the following specific examples illustrate certain aspects of the present invention and more particularly, point out methods of evaluating the same. However, the examples are set forth for illustration only and are not to be construed as limitations on the present invention as set forth in the appended claims. All parts and percentages are by weight unless otherwise specified.

EXAMPLE 1

Figure 7:
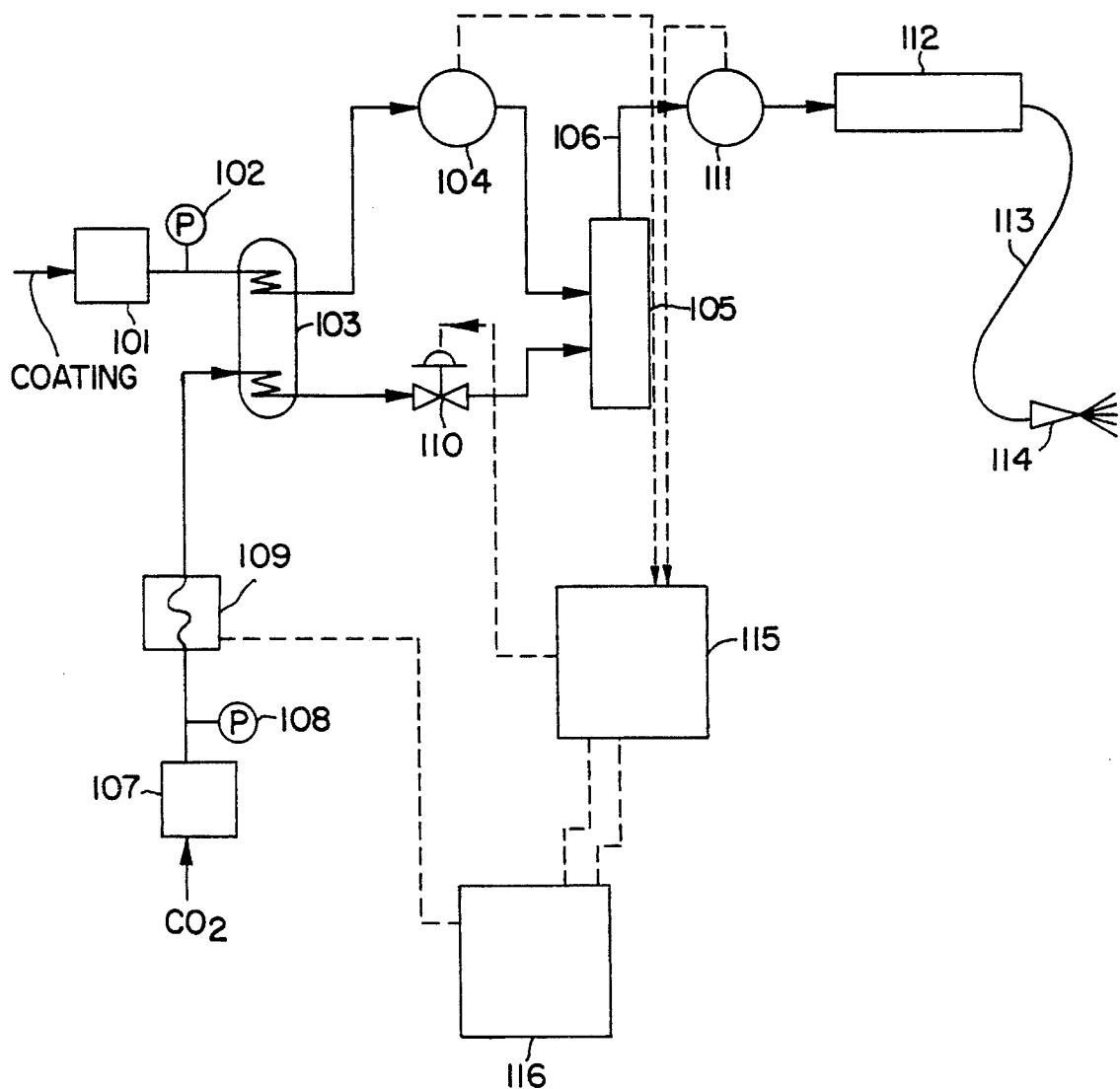
FIG. 7 is a diagram of the apparatus used to conduct the experimental trials described herein.

Apparatus suitable for studying the controllability of compressible fluid, specifically carbon dioxide, was constructed and is depicted in FIG. 7. The unit was comprised of feed pumps for coating formulation (101) and carbon dioxide (107), two flow gear meters (104) and (111), a control valve (110), heaters (103), a micro-processor based flow controller (115) and a homogeneous mixing unit for the two fluids (105). The coating material was fed from a container, and pressurized to 1500–2200 psig at room temperature by an air-driven liquid coating pump. The coating material was preheated to 30°–40° C. through a heater (103). The flow rates of coating material were measured by a precision gear meter (104). Liquid carbon dioxide was fed from a cylinder, and pressurized to 1500–2200 psi at room temperature by an air-driven carbon dioxide liquid pump (107). Then carbon dioxide was preheated to 30°–40° C. through a heater (103). These two fluids were mixed through a mixing unit (105), which was comprised of a sparger, and two Kenics™ mixers.

The flow rates of the mixture of coating material and carbon dioxide were measured by a precision gear meter (111), and heated in heater (112) to 45°–60° C. before spray application. The mixture of coating and carbon dioxide were re-circulated through the spray gun (114) to maintain constant spray temperature.

A multi-channel flow ratio computer (115) received signals of the flow rates from both gear meters, displayed the totaled flow rates, and was used to manipulate the position of a carbon dioxide control valve (110) to control a required carbon dioxide concentration in the coating mixture. For the data analysis, the flow rate of carbon dioxide was also monitored with a mass flow meter (109), and the data from gear meters (a) and (b) were interfaced to a computerized data acquisition system (116).

The specific items listed in FIG. 7 are as follows:

TABLE 3

| ITEM | DESCRIPTION |
|---|---|
| 101 | Coatings feed pump, Graco Model 205-530 |
| 102 | Pressure indicator, range from 0 to 3000 psi |
| 103 | Nordson H-400 series paint heater |
| 104 | Precision gear meter, ZHM-01, AW. Co. |
| 105 | Sparger and static Kenics™ mixer |
| 106 | Thermocouple, k-type |
| 107 | Carbon dioxide feed pump, Haskel |
| 108 | Pressure indicator, range from 0 to 3000 psi |
| 109 | Mass flow meter, Micro Motion meter Model No. D6 |
| 110 | Jordan control valve, Model 708, 0.002 cv, linear trim |
| 111 | Precision gear meter, ZHM-01, AW. Co. |
| 112 | Nordson heater H-400 |
| 113 | High pressure spray hose |
| 114 | High pressure spray gun |
| 115 | Multi-channel flow ratio computer, EMO-1005 |
| 116 | Computerized data acquisition system Cole Palmer, |

TABLE 3-continued

| ITEM | DESCRIPTION |
| --- | --- |
| | L-08338-20 |

Figure 8:
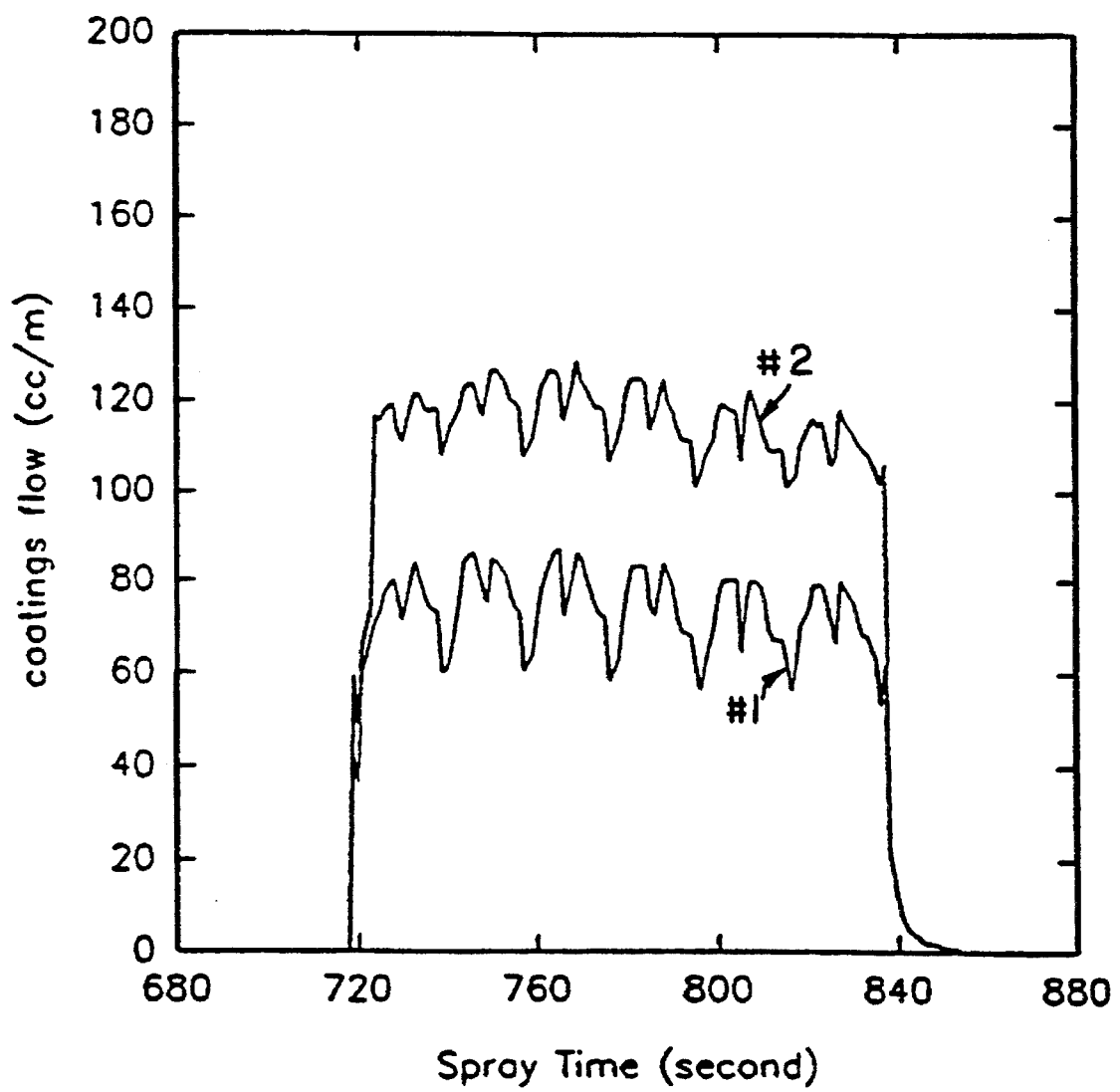
FIGS. 8, 9, 10 and 11 are graphical representations of flow rate versus time for the spray application of various coating mixtures.

FIG. 8 is a plot of coatings flow rate versus time (120 seconds) for continuous spraying of an admixed coating formulation from a spray apparatus depicted in FIG. 7. The coating formulation was a mixture of acrylic and melamine polymers and organic solvents. Point #1 in the FIG. 8 is the coatings flow rate measured by a precision gear meter (104). Point #2 in the FIG. 8 is the flow rate of the admixed coatings formulation flow rate measured by a precision gear meter (111). From the disclosure of this invention, carbon dioxide flow rate is the difference between the readings of gear meter (111) and the readings of gear meter (104).

EXAMPLE 2

Figure 2:
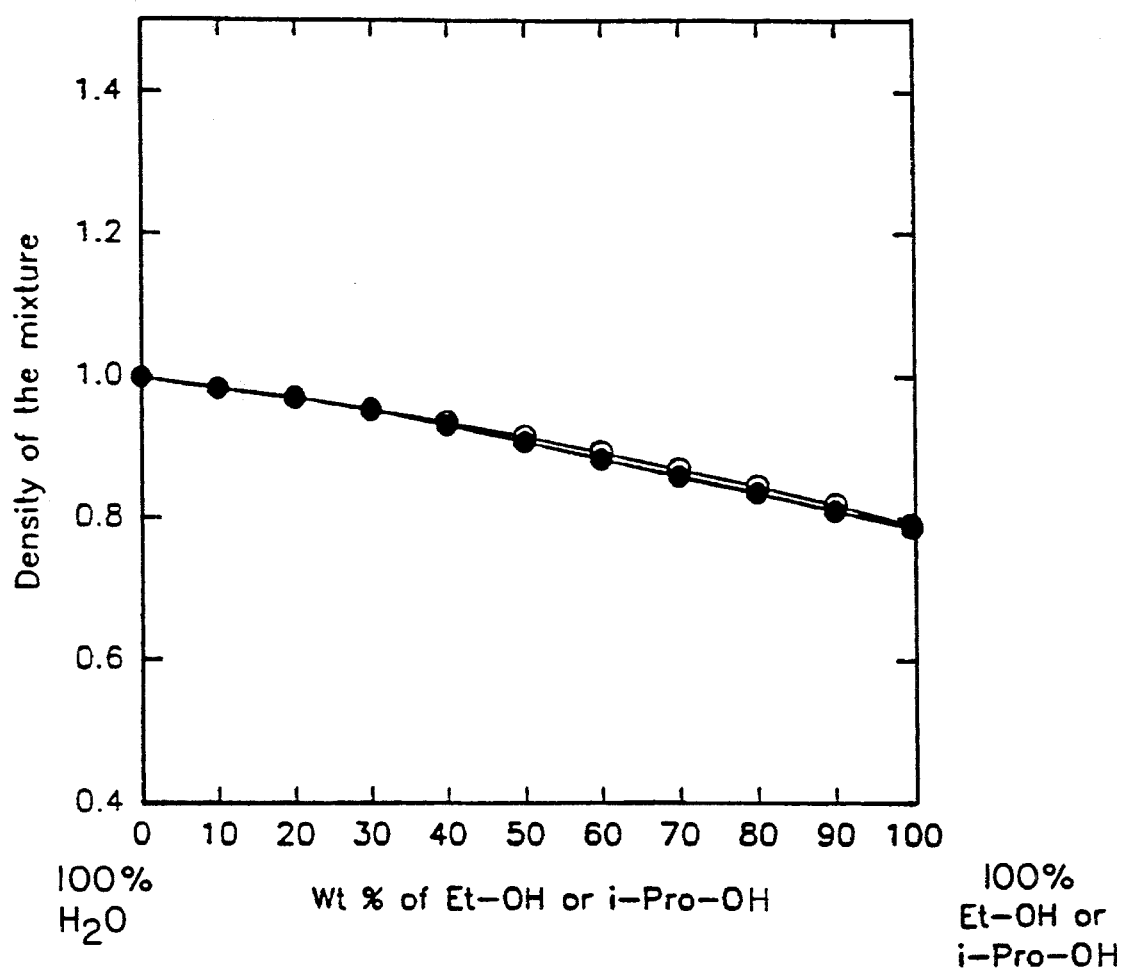
FIG. 2 is a graph of the density versus composition of ethanol/water and isopropyl alcohol/water systems.
Figure 3:
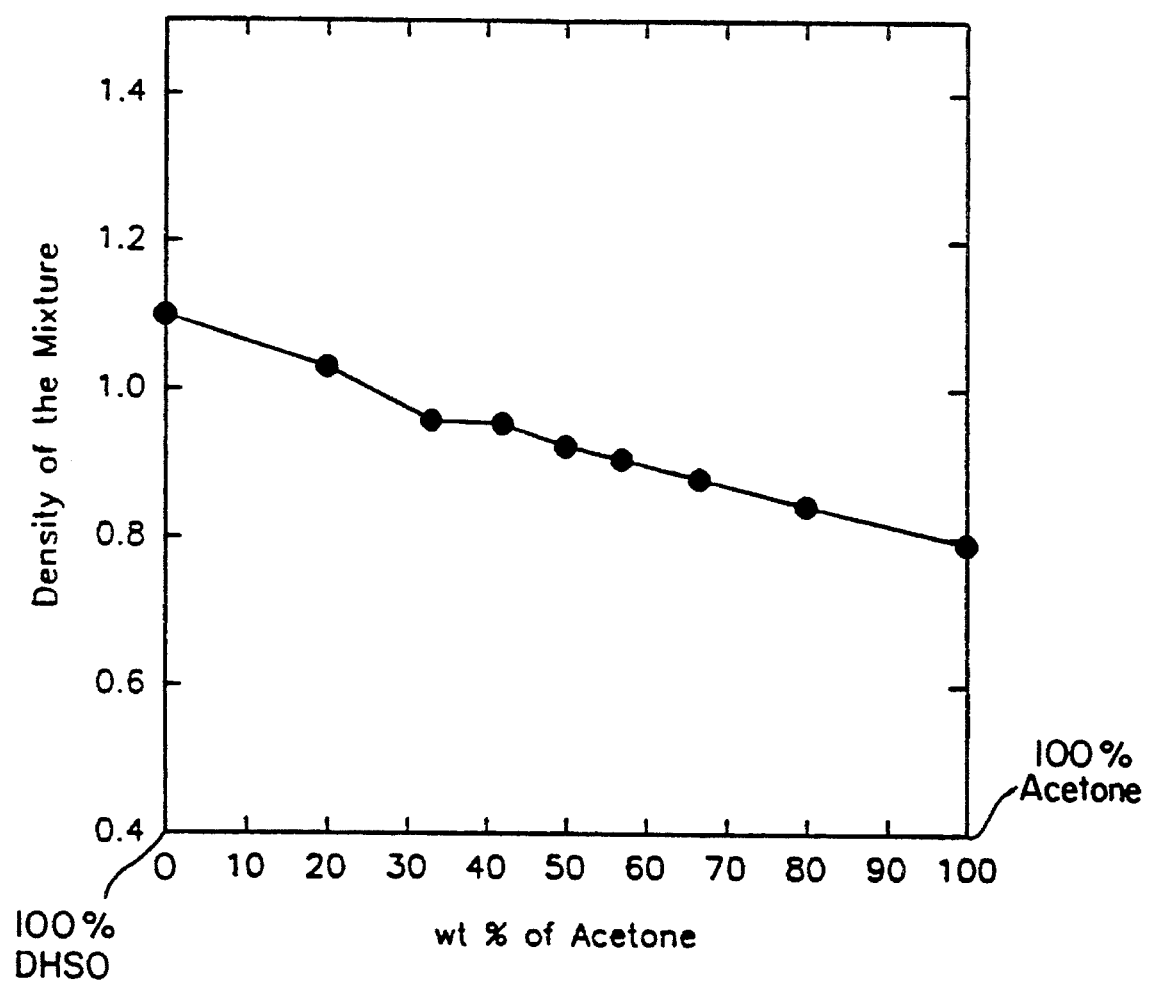
FIG. 3 is a graph of the density versus composition of a dimethyl sulfoxide/acetone system.
Figure 4:
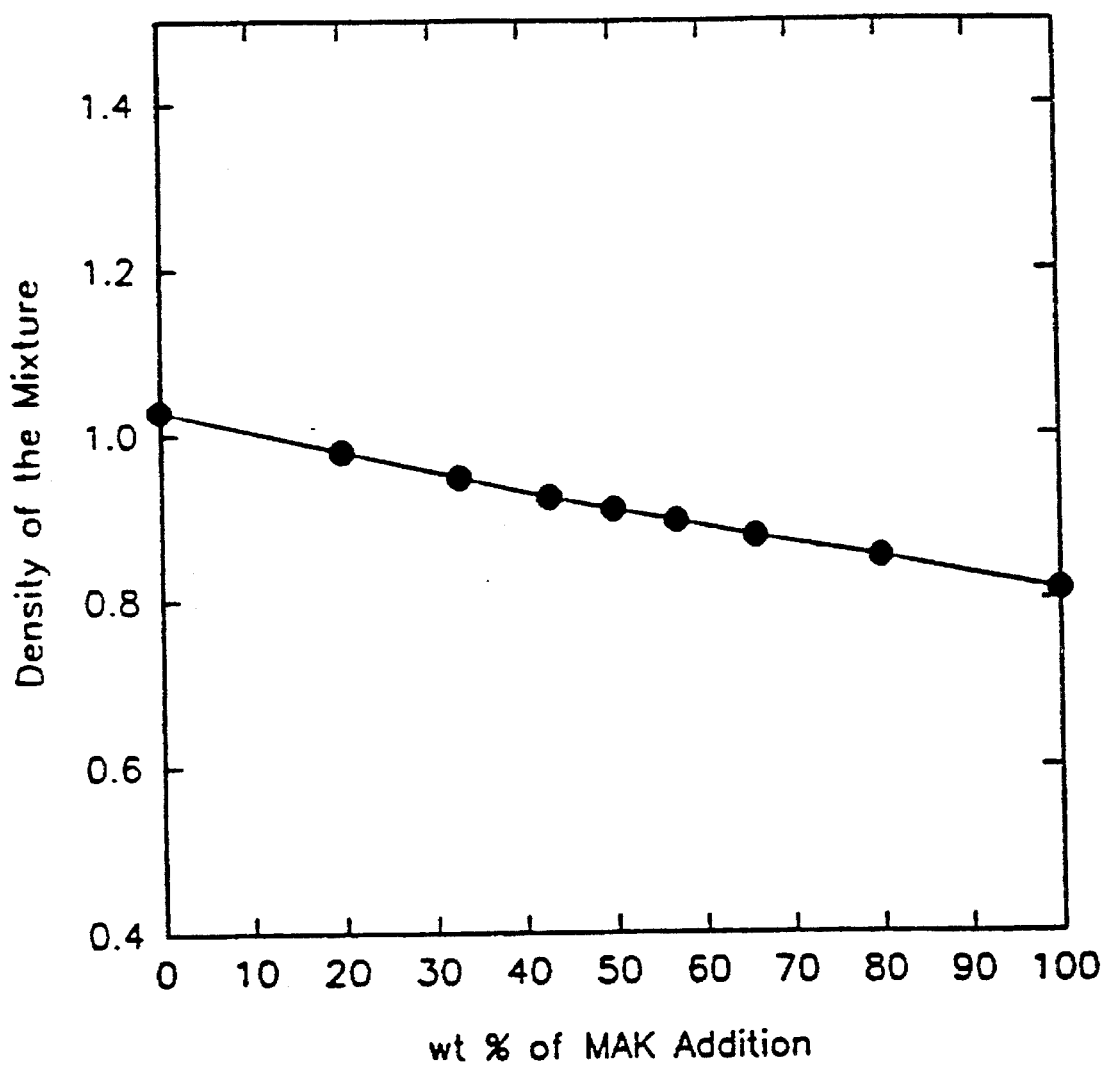
FIG. 4 is a graph of the density versus composition of an acrylic polymer/methyl aryl ketone solution.
Figure 9:
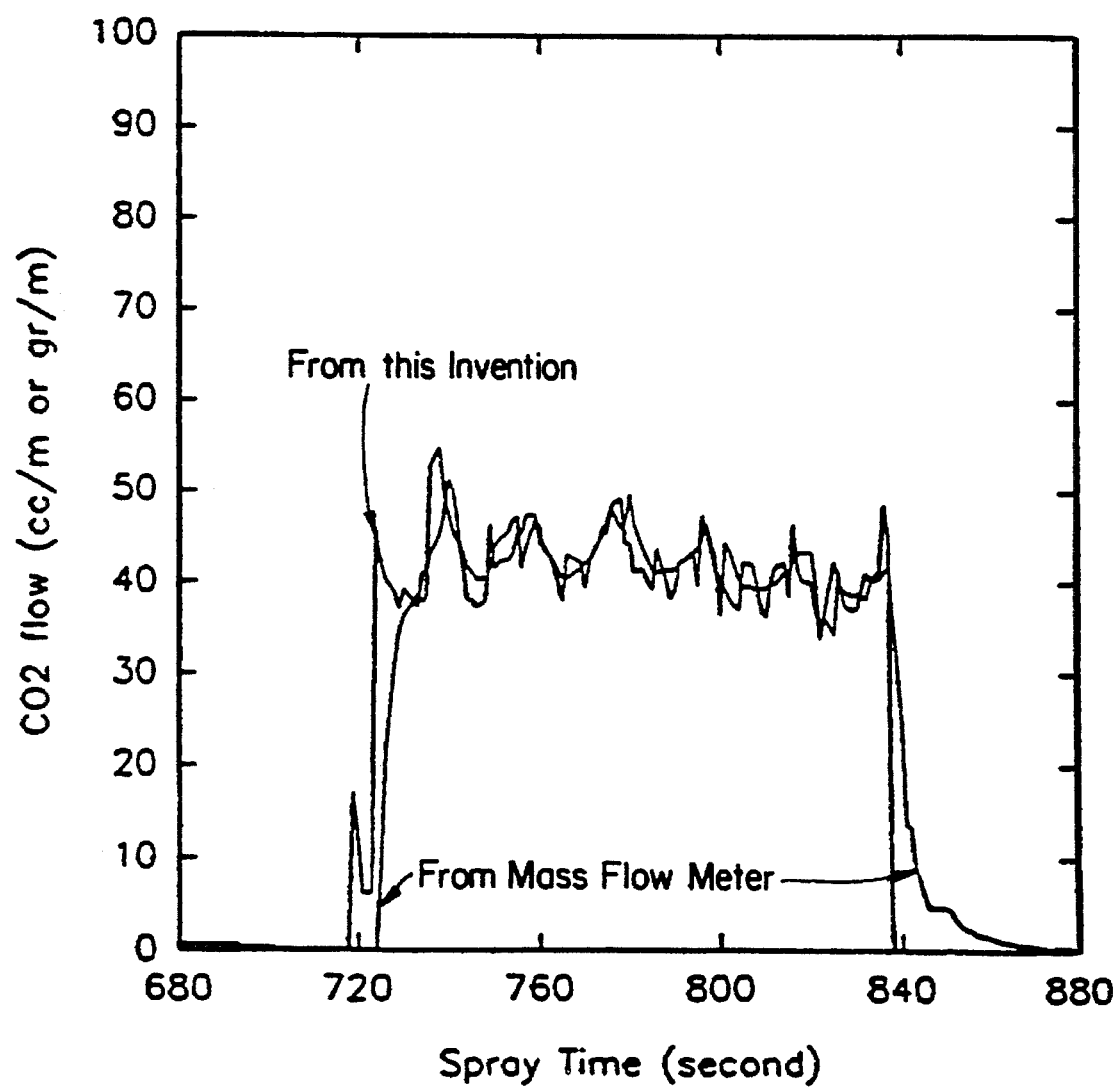

FIG. 9 illustrates carbon dioxide flow rates from a spray unit using the coating formulation described in Table 1 in an apparatus similar to FIG. 7 determined by two methods; 1) calculating the differences in flow rate between the two flow gear meters from FIGS. 7, and 2) actual carbon dioxide flow rates measured by the mass flow meter (109). The differences in the graphs is believed to be caused by response time delays and the effect of data averaging in the mass flow meter, because it requires 0.2–0.5 second time delays for the flow calculations to be conducted However, overall flows for 120 seconds were 89.0 cubic centimeters (cc) from this invention, and 89.5 grams from mass flow meter, indicating that the:

1. Density of the mixture of coatings and carbon dioxide is close to 1.0 grams/cc, which is almost the same as the density of coating material alone; and
2. The combination of two volumetric flow meters can be used to measure and accurately control carbon dioxide concentrations.

EXAMPLE 3

Figure 10:
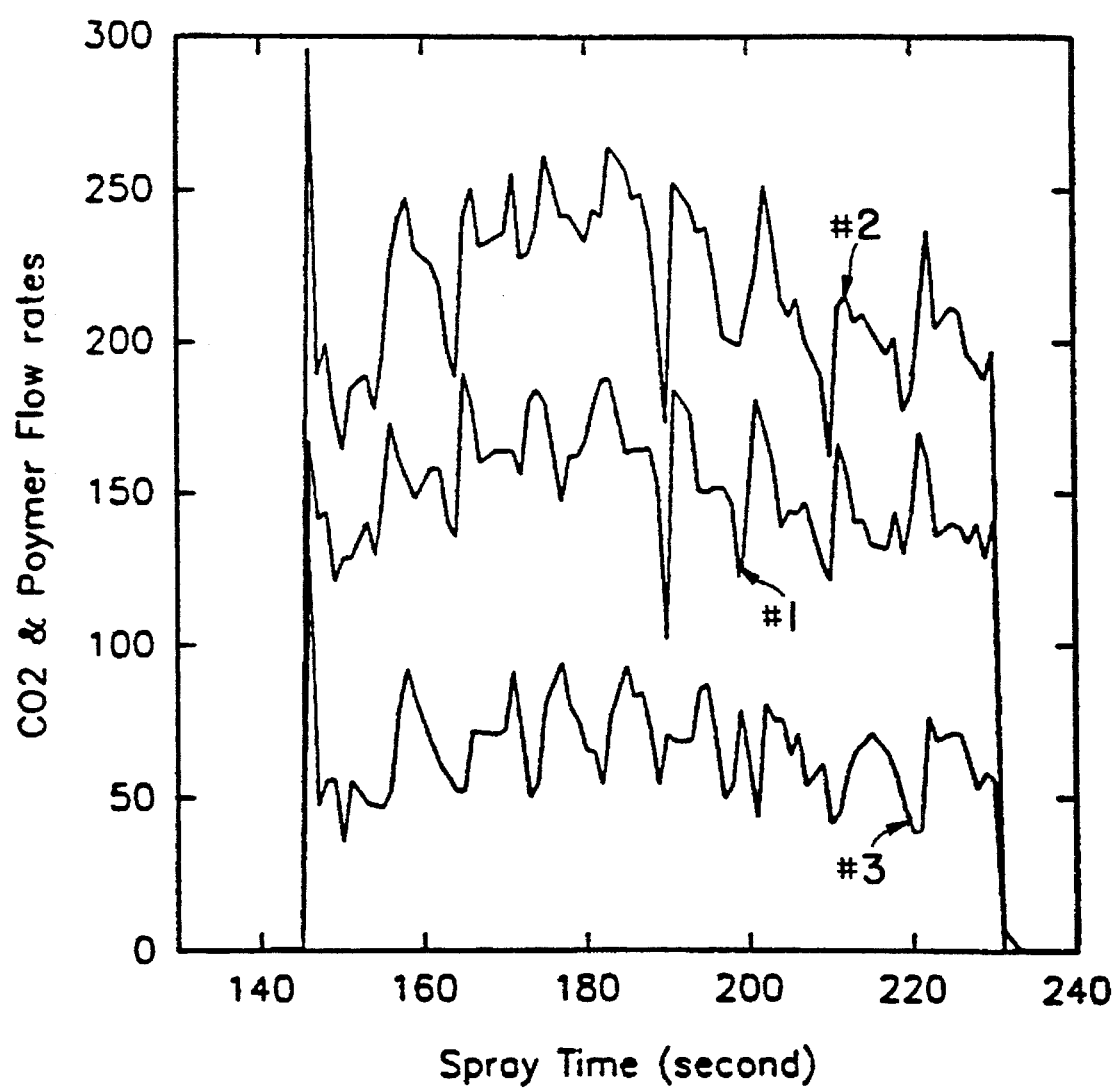

FIG. 10 shows three plots of flow rates; 1) coating composition,; 2) mixture of coating composition and carbon dioxide; and 3) carbon dioxide for a 90 second continuous spray interval using the coating formulation in Example 1. Apparatus similar to that disclosed in FIG. 7, without a recirculation loop was used. Line #1 in FIG. 10 indicates coatings flow rates measured by a precision gear meter. Line #2 in FIG. 10 was the coatings and carbon dioxide mixture flow rates measured by a precision gear meter. Line #3 in FIG. 10 carbon dioxide flow rates calculated from the differences between the readings of the gear meter and the readings of the flow meters. Overall these plots follow the same trends, and the totalized flow rates of coatings and mixture of coatings and carbon dioxide for 90 seconds were 219.5 cc and 310.9 cc, respectively. Therefore, carbon dioxide flows for 90 seconds were 91.4 cc from the method of the present invention, and 92.0 grams as measured by the mass flow meter, indicating that the combination of the two volumetric flow meters can be used to accurately measure and control carbon dioxide flowrates.

EXAMPLE 4

Figure 11:
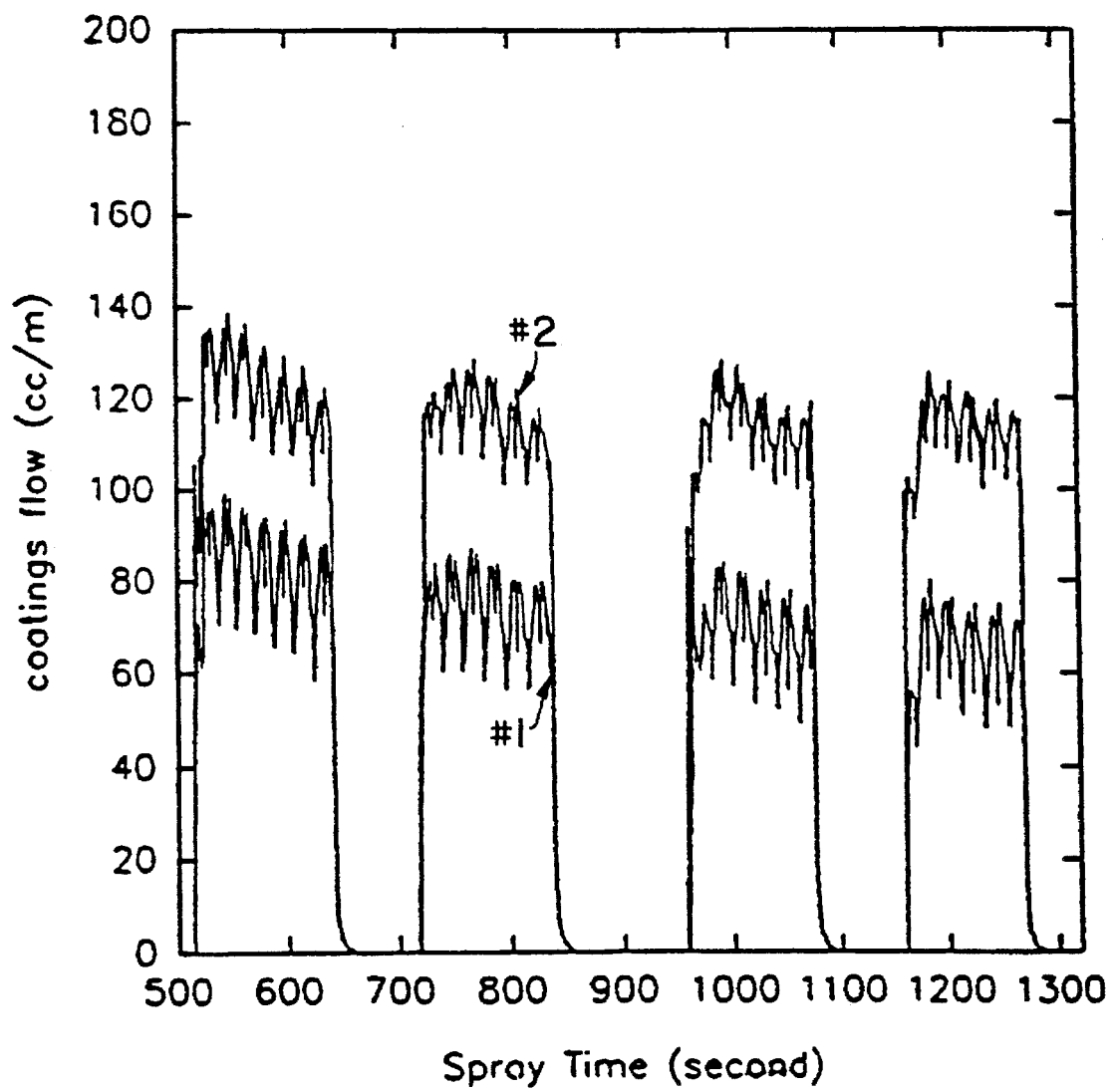
Figure 12:
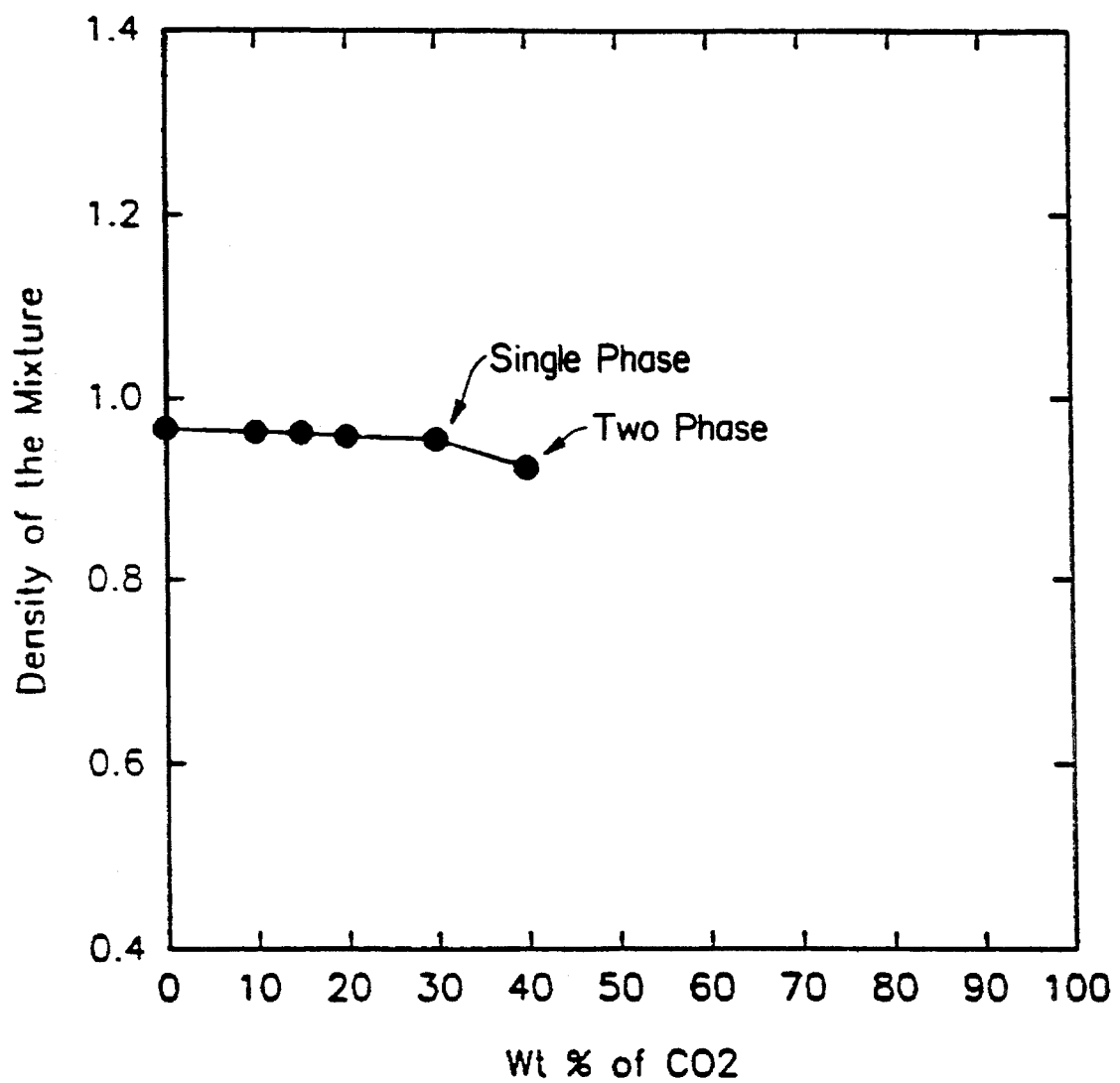
FIGS. 12 and 13 are graphs of the density versus composition for two coating compositions in carbon dioxide.

FIG. 11 shows two flow rates: 1) coatings; and admixed coating formulations intermittently sprayed for 800 seconds from a spray unit described in FIG. 7 without a recirculation loop. Point #1 in the FIG. 11 indicates coatings flow rates measured by a precision gear meter 104. Point #2 in the FIG. 11 indicates the flow rate of coating and carbon dioxide flow mixture measured by a precision gear meter 111. Overall, these plots followed the same trends, and the totalized flow rates of coatings and admixed coating formulation for 800 seconds were 2195 cc and 3109 cc, respectively. Therefore, carbon dioxide flows for 800 seconds were 914 cc as measured by the method of the present invention, and 920 grams from mass flow meter. The Example once again demonstrates that the combination of two volumetric flow gear meters can be used to measure and control carbon dioxide concentrations accurately.

EXAMPLE 5

In this example, the total flowrate of carbon dioxide obtained from a carbon dioxide mass flow meter and two volumetric gear meters were compared at the different process conditions. Apparatus depicted in FIG. 7 was employed to make the comparisons.

| | TRIAL | | | | |
| --- | --- | --- | --- | --- | --- |
| CONDITIONS | A | B | C | D | E |
| Conditions of at mixing, | | | | | |
| Temperature (°C.) | 33 | 36 | 40 | 45 | 50 |
| Pressure (psi) | 1600 | 1600 | 1600 | 1600 | 1600 |
| $CO_2$, measured from mass meter (grams) | 101 | 115 | 105 | 96 | 86 |
| $CO_2$ measured(cc) from flow meters | 105 | 121 | 112 | 120 | 130 |
| Relative error (%) | 3.5 | 5.2 | 6.7 | 25 | 51 |

Relative error is defined as ($CO_2$ from this invention-$CO_2$ from mass meter)/$CO_2$ from mass meter.

As expected with increasing temperatures, the density of the admixed coating formulation changes. The changing density of the mixture results in a larger percentage error when relying on volumetric measurements.

EXAMPLE 6

The total amount of carbon dioxide mixed with a coating formulation and sprayed from apparatus depicted in FIG. 7 was measured. The amount of carbon dioxide used was measured using a mass flow meter and two volumetric gear meters. The coating formulation consisted of 69 weight percent AT-954 Acrylic, available from Rohm & Haas, and 31 weight percent MAK. The pressure and temperature at the coatings and carbon dioxide mixing unit were maintained at 1600 psi and 36° C., respectively.

| | TRIAL | | |
| --- | --- | --- | --- |
| CONDITIONS | A | B | C |
| $CO_2$, concentration in the formulation | 15% | 27.6% | 39% |
| $CO_2$, measured from mass meter (grams) | 31 | 50 | 71 |
| $CO_2$, measured from volumetric meter (cc) | 30.5 | 50.0 | 74.9 |
| solution appearance | clear | clear | haze |
| Relative error (%) | 1.6% | 0.0% | 5.5% |

Relative error is defined as ($CO_2$ from this invention-$CO_2$ from mass meter)/CO₂ from mass meter A clear solution appearance is indicative of a single phase solution. A hazy appearance indicates that the solution is in two distinct phases. This Example demonstrates the highly accurate proportionation of the fluids when the single phase solution is maintained. When a two phase solution is created, the density of the solution typically begins to change rapidly and the accuracy of the proportionation apparatus is diminished.

EXAMPLE 7

The apparatus of Example 1 was used to spray the formulation of Table 1 with carbon dioxide at 1500 psi and 50° C.

At 1500 psi and 50° C., densities of coating formulation and supercritical carbon dioxide were 0.9652 g/cc and 0.3978 g/cc, respectively. With the addition of carbon dioxide into the formulation (a) up to 30 percent, the mixture densities decreased less than 1.2 percent. However, with the addition of more than 40 percent carbon dioxide, mixture densities decreased significantly, and the coating formulation displayed two distinct phases; a carbon dioxide rich phase and a polymer rich phase.

EXAMPLE 8

Figure 13:
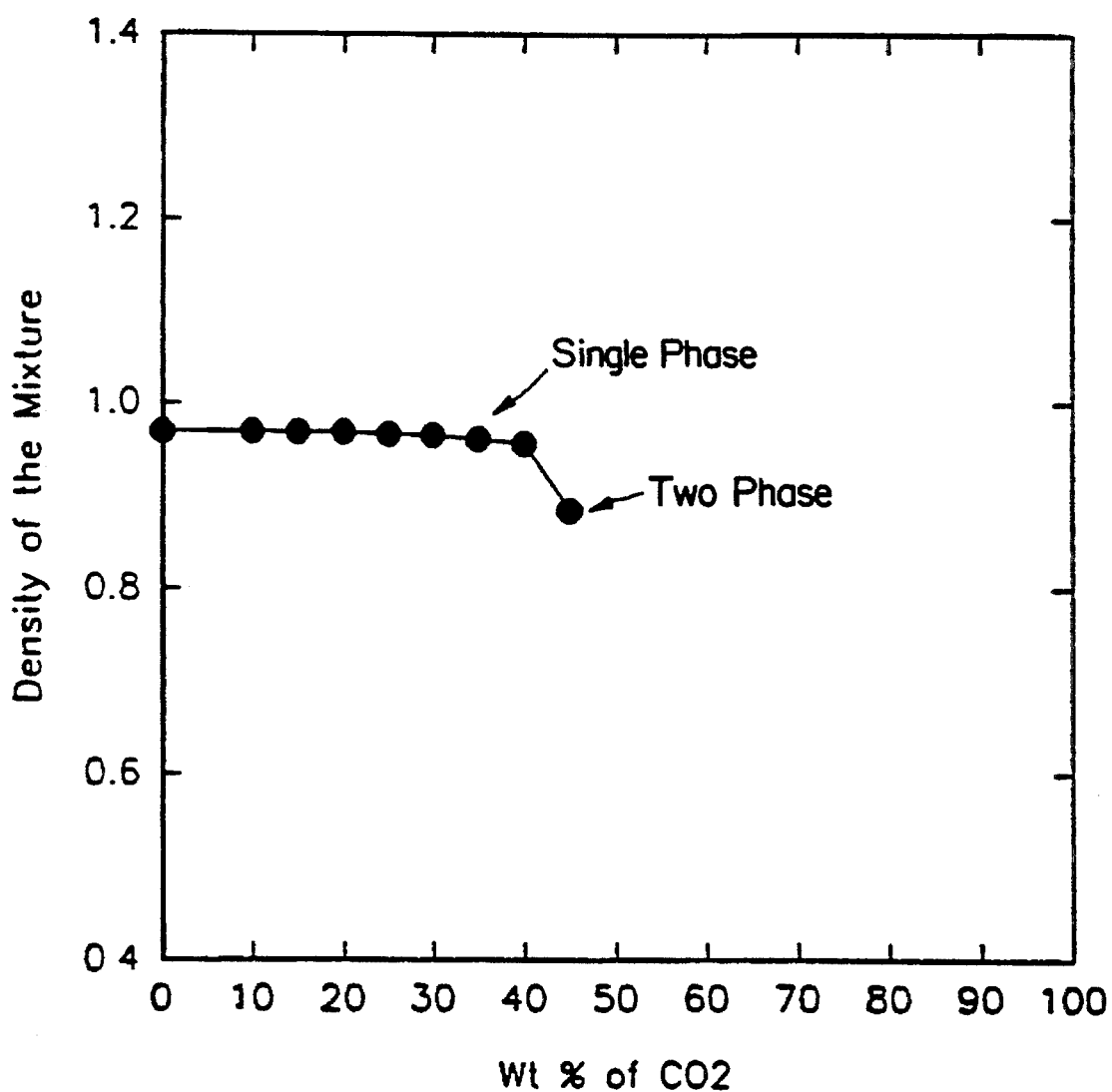

FIG. 13 is a graph of mixture density of the coating formulation listed below with carbon dioxide at 1500 psi and 50° C. as measured by the spray unit depicted in FIG. 6. At 1500 psi and 50° C., the densities of the coating formulation and supercritical carbon dioxide were measured as 0.9700 g/cc and 0.3978 g/cc, respectively. Adding carbon dioxide into the admixed coating formulation up to levels approaching 40 percent, the admixed coating formulation mixture density decreased less than 1.5 percent. However, with the addition of more than 45 percent carbon dioxide into the admixed coating formulation, the mixture density significantly decreased, and the mixture separated into distinctive two phases.

| Components | Weight percent |
| --- | --- |
| Alkyd, 6255-03 | 20.6% |
| Nitrocellulose, | 5.7% |
| Plasticizer | 9.5% |
| Water | 4.8% |
| Solvents (mixture of MAK, i-propyl alcohol, n-butanol, EEP) | 57.1% |

EXAMPLE 9

Figure 5:
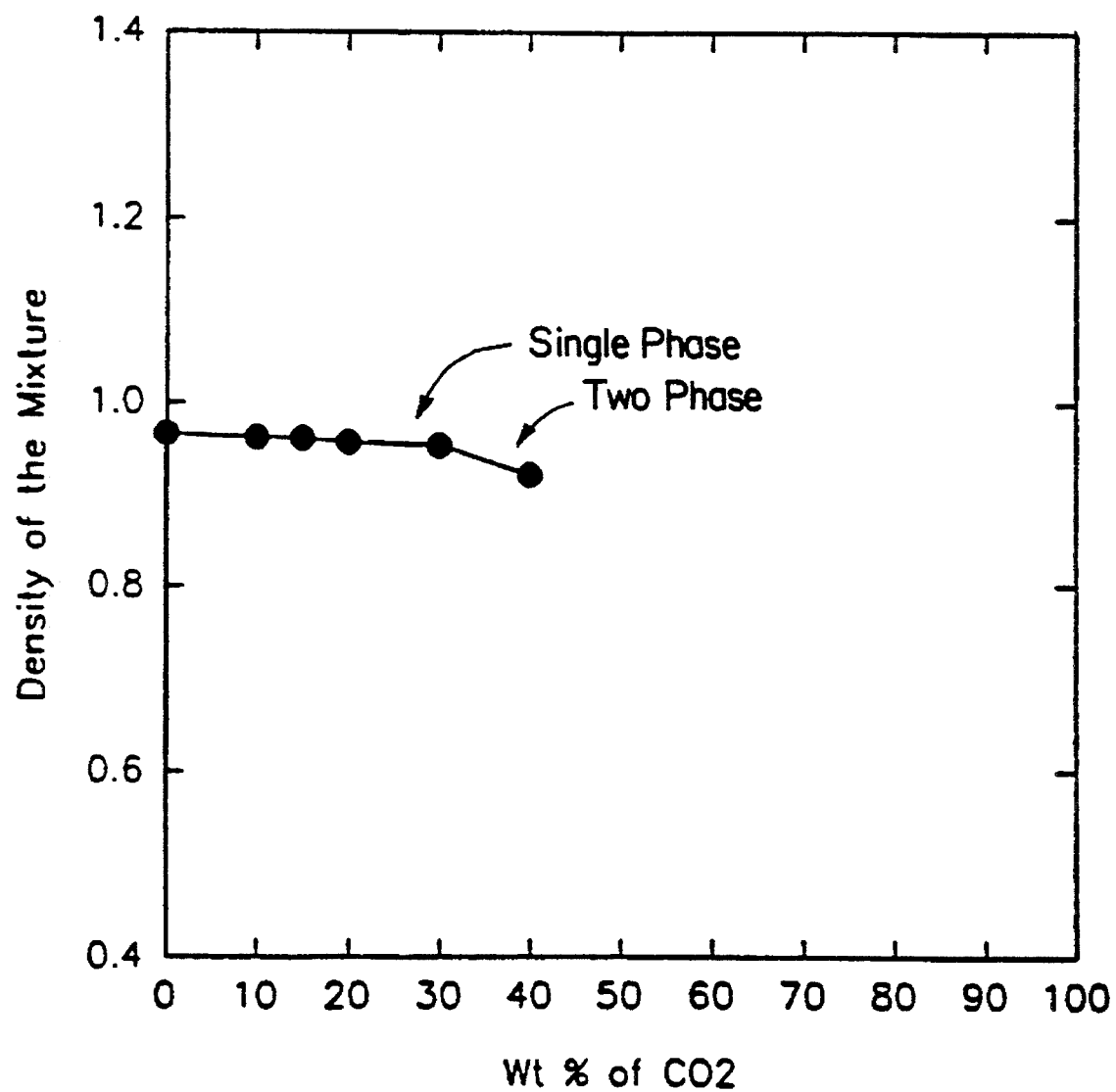
FIG. 5 is a graph of the density versus composition of a polymeric coating composition/carbon dioxide solution.
Figure 14:
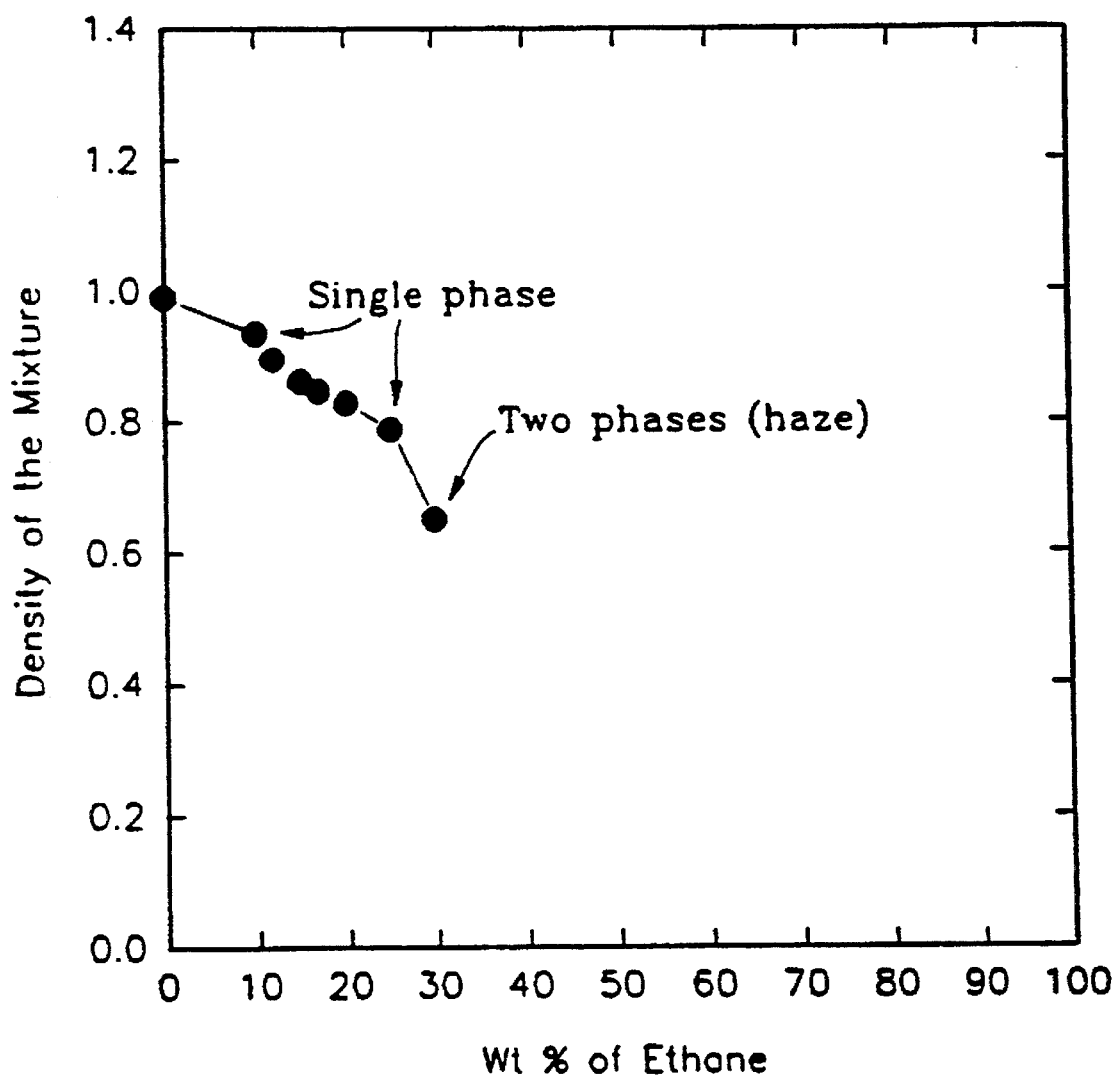
FIGS. 14 and 15 are graphs of the density versus composition for two coating compositions in ethane.

FIG. 14 is a plot of mixture density of coating formulation from Example 8 with supercritical ethane at 1500 psi and 50° C. measured from a spray unit in FIG. 5. At 1500 psi and 50° C., the densities of the coating formulation and supercritical ethane were measured as 0.9652 g/cc and 0.203 g/cc, respectively. With the addition of ethane into the formulation at levels up to about 25 percent, the mixture was a single clear phase. However, the mixture density decreased more than 19 percent.

EXAMPLE 10

Figure 6:
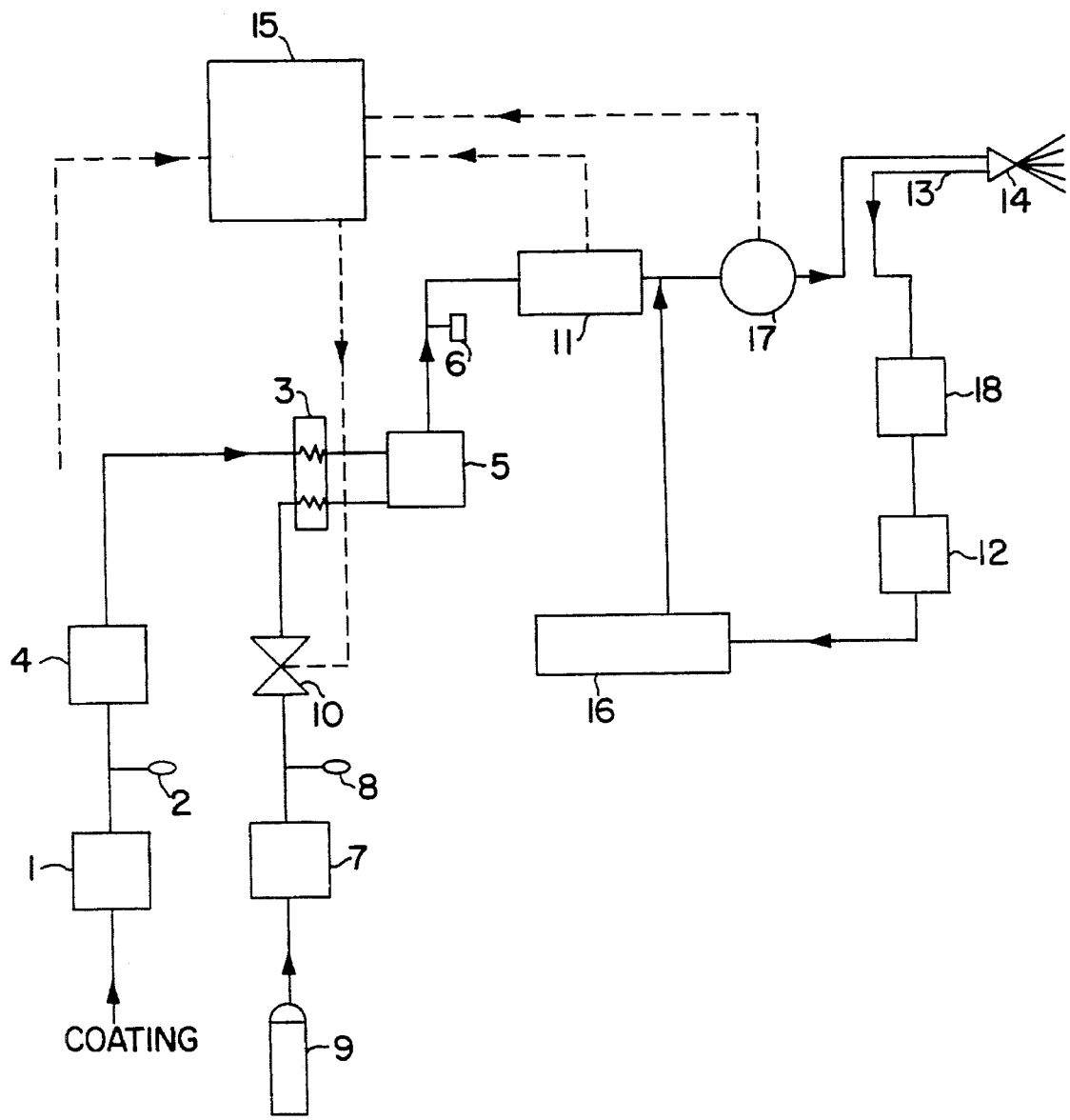
FIG. 6 is a diagram of the apparatus suitable for proportioning and spraying a compressible fluid and non-compressible fluid.
Figure 15:
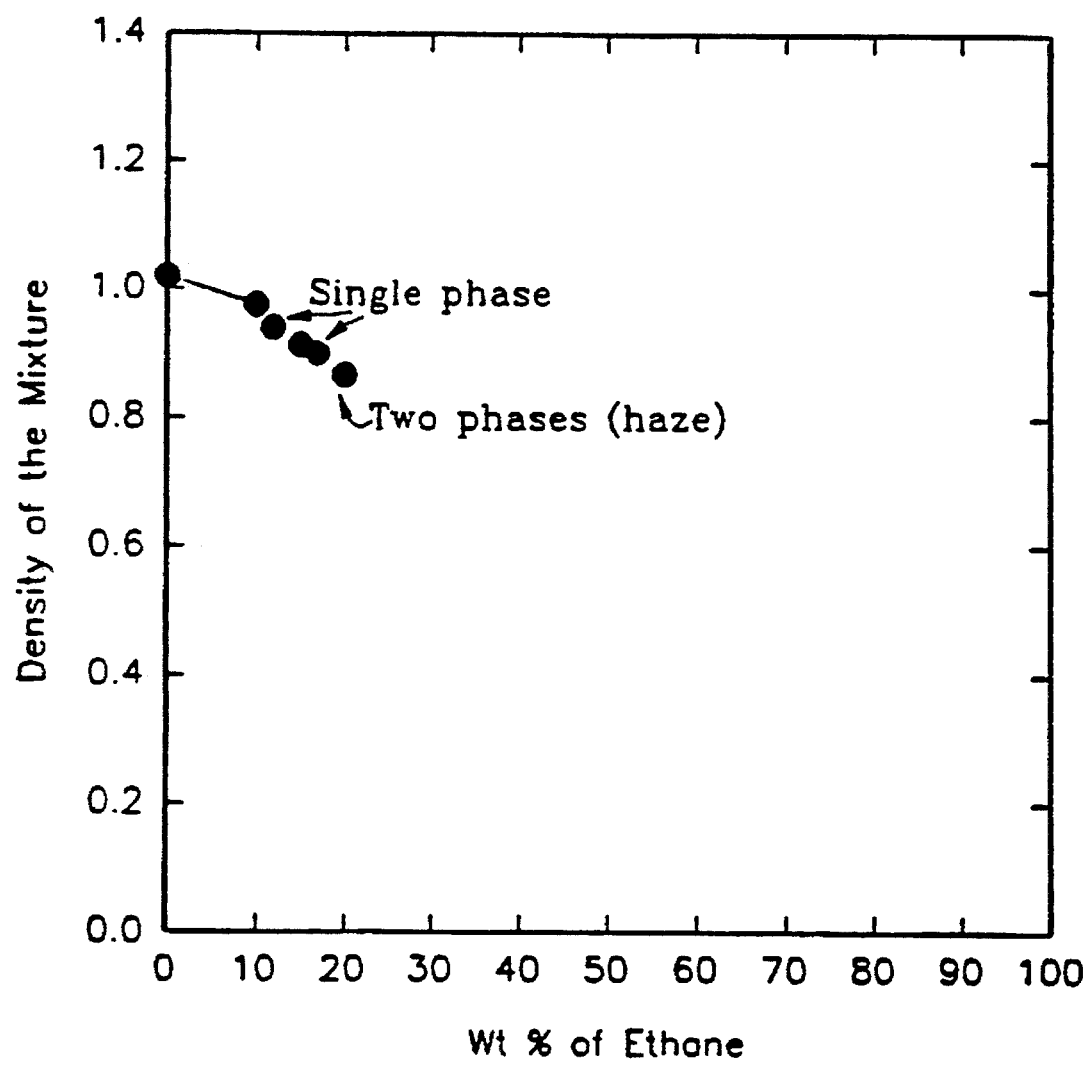

FIG. 15 is a plot of mixture density of coating formulation from Example 7 with supercritical ethane at 1500 psi and 50° C. measured from the spray unit depicted in FIG. 6. At 1500 psi and 50° C., the densities of 100 percent of coating formulation and supercritical ethane were measured as 0.9652 g/cc and 0.203 g/cc, respectively. With the addition of ethane into the formulation (a) up to 17 percent, the mixture showed a single clear phase. However, the mixture densities decreased more than 11.7 percent.

FIGS. 12–15 clearly demonstrate that the unexpected constant density properties of the admixed coating formulations especially when using supercritical carbon dioxide as a viscosity reducing agent. However, when a two phase solution is created, the density of the mixture can vary significantly with increasing compressed fluid levels. The ethane mixtures did not exhibit a substantially constant density region when admixed, therefore the present invention would not be suitable for accurately proportionately these mixtures.

We claim:

1. A process for preparing a mixture of a compressible and a non-compressible fluid comprising:

a) providing a non-compressible fluid;

b) measuring said non-compressible fluid's volumetric flow rate;

c) providing a compressible fluid;

d) mixing the compressible fluid with a sufficient amount of the non-compressible fluid such that the density of the resulting mixture behaves substantially like a non-compressible fluid;

e) measuring the volumetric flow rate of the mixture; and f) controlling the flow rate of the compressible fluid based upon the volumetric flow rate of said mixture.

2. The method of claim 1 wherein the compressible fluid is a polymeric material and the compressible fluid is a supercritical fluid.

3. The method of claim 2 wherein the supercritical fluid is carbon dioxide.

4. The method of claim 3 wherein the amount of supercritical carbon dioxide in the mixture is less than about 50% of the total mixture by weight.

5. The method of claim 2 wherein the resulting polymeric material/supercritical fluid mixture is sprayed onto a substrate.

6. The method of claim 5 wherein the polymeric material/supercritical mixture is recirculated prior to spraying.

7. The method of claim 1 wherein a second non-compressible fluid is provided to the non-compressible fluid prior to being measured by the volumetric flow meter.

8. The method of claim 1 wherein precision gear meters are employed to measure the flow rate of the compressible fluid and resulting mixture.

* * * * *